United States Patent [19]

Broaddus et al.

[11] 3,918,524
[45] Nov. 11, 1975

[54] FRACTURE ACIDIZING METHOD

[75] Inventors: Gene C. Broaddus; Sherman E. Fredrickson, both of Duncan, Okla.

[73] Assignee: Halliburton Company, Duncan, Okla.

[22] Filed: Aug. 21, 1974

[21] Appl. No.: 499,379

[52] U.S. Cl. ................................. 166/307; 166/308
[51] Int. Cl.² ..................... E21B 43/26; E21B 43/27
[58] Field of Search .......... 166/307, 308, 271, 274, 166/259, 281, 282

[56] References Cited
UNITED STATES PATENTS

| | | |
|---|---|---|
| 2,693,854 | 11/1954 | Abendroth........................ 166/308 |
| 3,003,554 | 10/1961 | Craig, Jr. et al..................... 166/274 |
| 3,528,503 | 9/1970 | Crowe................................. 166/307 |
| 3,529,666 | 9/1970 | Crowe................................. 166/307 |
| 3,529,669 | 9/1970 | Tietz................................... 166/307 |
| 3,530,938 | 9/1970 | Cooper............................... 166/274 |
| 3,550,686 | 12/1970 | Knox................................... 166/307 |

*Primary Examiner*—Stephen J. Novosad
*Attorney, Agent, or Firm*—Thomas R. Weaver; John H. Tregoning; C. Clark Dougherty, Jr.

[57] ABSTRACT

An improved method of fracture acidizing an underground well formation to create high capacity flow channels therein whereby the acidizing aspect of the treatment is carried out in substantially all portions of fractures created in the formation.

16 Claims, 3 Drawing Figures

FRACTURE ACIDIZING METHOD

The present invention relates to the field of fracture acidizing well formations, and more particularly, but not by way of limitation, to an improved method of treating a well formation containing fractures whereby high capacity flow channels are formed over the entire faces of the fractures.

Many various methods have been developed and used for increasing or stimulating the production of oil, gas and the like from an underground well formation penetrated by a well bore. One commonly used method of well stimulation where the producing formation to be stimulated is formed of relatively low permeability material consists of exerting fluid pressure on the formation to create one or more fractures therein and then extending the created fractures outwardly from the well bore. After the fractures have been created the faces of the fractures are etched with acid so that when the formation is returned to production and the fractures close, high capacity flow channels remain in the faces of the fractures through which desired fluids contained in the formation flow to the well bore. This technique of fracturing and acidizing a formation to create flow channels is known in the art as "fracture acidizing".

In fracture acidizing as well as other fracture treatment procedures used heretofore, less than optimum results have often been achieved due to the treating fluid gravitating into the bottom portion of the fractures leaving the upper portions thereof untreated. In acidizing procedures carried out heretofore, it has been conventional practice to precondition a formation with a relatively low density preflush fluid such as water or a relatively lightweight aqueous solution prior to introducing an acid solution thereinto. For example, low density aqueous solutions of potassium chloride are commonly used to prevent clays from swelling. The acid solutions used are generally of higher density than the preflush or fracturing fluids so that upon the introduction of the acid solution into fractures created in the formation, the acid solution is segregated and caused to underride the preflush or fracturing fluid into the bottom portion of the fractures.

By the present invention an improved method of treating a well formation with a treating fluid such as an acid solution is provided wherein the treating fluid is prevented from underriding preflush or other fluids in the formation and is caused to contact the faces of fractures in the formation over their entire heights and lengths. The present invention broadly comprises the steps of first introducing a preflush fluid into the fracture or fractures, the preflush fluid having a density substantially equal to the density of the treating fluid to be used, and then introducing the treating fluid into the fracture or fractures so that the treating fluid is distributed over substantially the entire areas of the fracture faces and is not segregated into the lower portion of the fractures.

The method of the present invention can be carried out in formations including natural fractures or in formations wherein artificial fractures are created therein and extended by exerting fluid pressures thereon. Further, where fractures are induced in a formation, the preflush fluids of the present invention can be utilized as the fracturing fluids for creating the fractures and the fractures can be extended simultaneously with the carrying out of the treatment method.

In the accompanying drawings forming a part of this disclosure:

In treating underground well formations penetrated by well bores, particularly those formed of relatively impermeable and fracturable materials, it has become common practice to induce fractures in the most productive zone of such formations and extend the fractures laterally outwardly from the well bore whereby desired fluids more freely flow from the formation into the well bore. In most formations, induced fractures are vertically orientated, i.e., the fracture or fractures produced lie in a substantially vertical plane paralleling the axis of the well bore. The induction of such fractures is generally accomplished by pumping a fracturing fluid through the well bore into the formation thereby exerting hydraulic pressure on the formation at a point in the most productive and desired zone. Once parting of the formation is achieved, continued pumping of the fracturing fluid at high pressures into the formation extends the fracture or fractures outwardly from the well bore. Acidizing of the fracture faces is accomplished by introducing an acid solution into the fractures, which introduction can be accomplished while the fractures are being extended, so that high capacity flow channels are etched and remain in the formation after the fractures are allowed to close.

Figure 1:
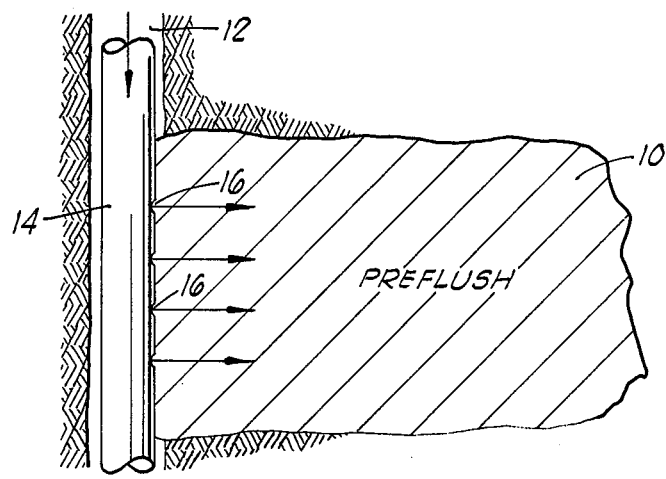
FIG. 1 is a schematic illustration of a fracture in an underground well formation after a preflush fluid of the present invention has been introduced therein.

Referring now to the drawings and particularly to FIG. 1, a vertical fracture 10 in an underground well formation is schematically illustrated extending laterally outwardly from a well bore 12 penetrating the formation. A casing or liner 14 is shown positioned in the well bore 12 having perforations 16 disposed therein positioned adjacent a desirable production zone of the formation. The fracture 10 can be natural or induced, and in either case, a preflush fluid is introduced into the fracture by pumping the fluid under pressure through the conduit 14 into the fracture by way of the perforations 16. As will be understood, if the fracture is induced, the preflush fluid of this invention can be utilized for inducing the fracture.

Figure 2:
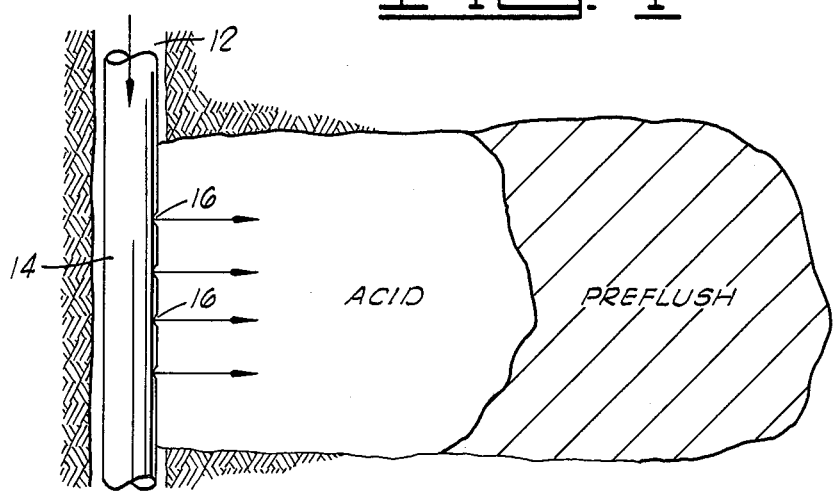
FIG. 2 is a schematic illustration of the fracture of FIG. 1 after a treating fluid of the present invention has been introduced therein.
Figure 3:
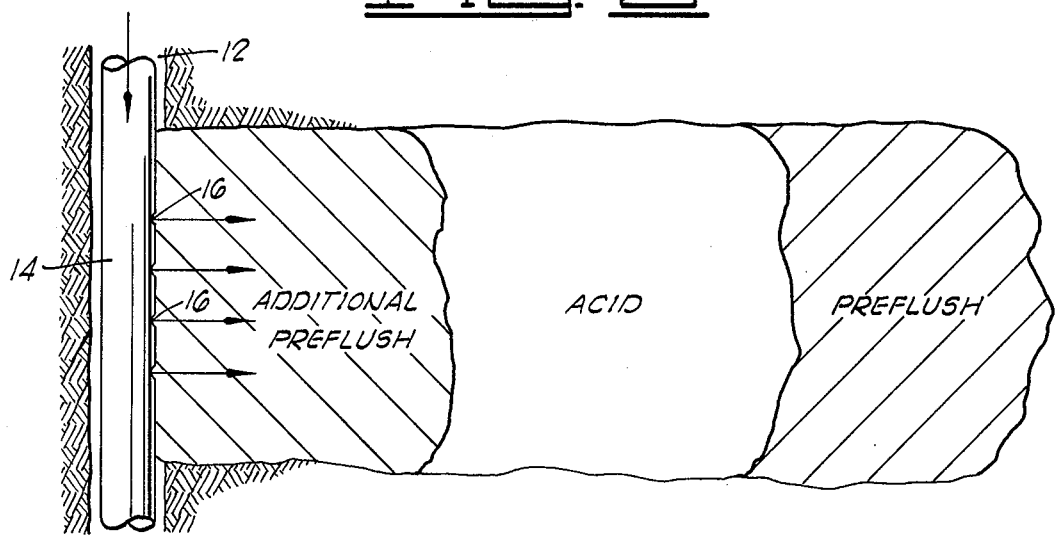
FIG. 3 is a schematic illustration of the fracture of FIG. 1 after additional preflush fluid has been introduced therein.

In accordance with the present invention, a preflush fluid is utilized having a density substantially equal to the density of the acid or treating fluid to be used. After pumping the preflush fluid into the fracture 10 as shown in FIG. 1, the treating fluid is introduced therein as shown in FIG. 2. Because the preflush fluid utilized is of substantially the same density as the treating fluid, the treating fluid is distributed over the entire height or areas of the fracture faces as shown in FIG. 2 and does not override or underride the preflush fluid. This is contrasted with typical acidizing procedures used heretofore wherein the acid treating fluid is of relatively high density and the preflush fluid of relatively low density causing the treating fluid to be segregated and to gravitate to the bottom of the fracture 10.

After a quantity of the treating fluid has been introduced into the fracture 10, an additional quantity of preflush fluid may be introduced therein to maintain the treating fluid distributed over the fracture faces. Successive quantities of preflush fluid and treating fluid can be continuously introduced into the fracture 10 while applying sufficient hydraulic pressure to maintain the fractures in an open position thereby forcing the treating fluid outwardly in the fracture, extending the fracture and simultaneously treating the fracture faces substantially over their entire heights and lengths.

Thus, in accordance with the method of the present invention the densities of the preflush fluid and treating fluid used are controlled to prevent separation and segregation of the treating fluid within the fracture. While any of a variety of fluids can be utilized in carrying out the method, water and aqueous solutions are preferred because of their availability and general compatibility with well formations.

High viscosity fluids tend to move through a fracture in a well formation as a mass with less tendency to cause overriding or underriding of subsequently introduced fluids, and therefore, preflush and treating fluids having relatively high viscosities are particularly suitable for use in accordance with this invention. In addition, it has been found that when a highly viscous preflush fluid is utilized followed by a treating fluid of less viscosity, the treating fluid has a tendency to form fingers or channels into the preflush fluid. This channeling effect is beneficial in that the treating fluid is prevented from gravitating downwardly. Thus, a highly viscous preflush fluid, e.g., a fluid having an apparent viscosity of above about 100 cps, followed by a treating fluid of substantially the same density but having a viscosity considerably lower than the preflush fluid can be used to good advantage. However, fluids of the same viscosity can also be used in accordance with this invention so long as the densities thereof are substantially equal.

In acidizing treatments, as the acid treating fluid reacts with material forming the fracture faces in a formation, it increases in density. Thus, when a preflush fluid is used having the same density as the density of the unspent acid used, the density of the acid can increase to a level above the density of the preflush fluid. However, by the time the acid density increases to a level causing it to move downwardly through the preflush fluid, it usually is very nearly spent. In this regard, it is preferred that the density of the preflush fluid be adjusted so that it is higher than the unspent acid by an amount whereby after the acid is one-quarter spent its density is equal to the density of the preflush fluid. The most preferred preflush fluids for use in accordance with this invention are aqueous sodium chloride solutions, aqueous calcium chloride solutions, and aqueous potassium chloride solutions. The most preferred treating fluids are those in the form of aqueous solutions.

Specific preferred aqueous preflush fluids for carrying out fracture acidizing techniques using the methods of this invention are solutions ranging in specific gravity of from about 1.0 to about 1.4 at room temperature (room temperature is used herein to mean a temperature in the range of from about 15°C to about 20°C). Aqueous acid solutions having specific gravities in the range of from about 1.02 to about 1.34 at room temperature are particularly suitable for use with the preflush fluids. Aqueous solutions of hydrochloric acid and hydrochloric acid-organic acid mixtures, e.g., hydrochloric-acetic acid mixtures, are most preferred for carrying out fracture acidizing procedures. Alcohol-hydrochloric acid solutions are also suitable in cases where an extra light acid treating fluid is required.

As stated above, successive quantities of preflush fluid and acid treating fluid can be continuously pumped or otherwise introduced into a fracture to extend the fracture while maintaining the acid distributed throughout the fracture. As is well understood by those skilled in the art, the acid is moved through the fracture while the fracture is maintained in an open position by fluid pressure exerted thereon so that the fracture is extended and channels are etched in the faces of the fracture by the reaction of the acid therewith. When the fractures have been extended to the desired extent and the acid has become spent, the fluid pressure exerted on the formation is withdrawn causing the fractures to close, but leaving high capacity flow channels remaining therein.

A variety of conventional additives can be incorporated with the preflush and treating fluids utilized to vary their physical characteristics, e.g., fluid loss additives, viscosity increasing agents, wetting agents, etc. In order to more clearly illustrate the present invention in carrying out fracture acidizing procedures, the following example is given:

EXAMPLE

A balanced preflush-acid system is employed so that the acid does not overrun or underrun the preflush fluid or vice versa, which produces an even treatment of the entire fracture faces.

In Table I below the preflush fluid densities which are preferred for use with various hydrochloric acid treating solutions are presented:

TABLE I

| Acid Treating Fluid To Be Used | PREFLUSH FLUID DENSITIES PREFERRED FOR USE WITH VARIOUS HYDROCHLORIC ACID SOLUTIONS | | | | |
|---|---|---|---|---|---|
| | Acid Strength, By Weight | Acid Treating Fluid Specific Gravity | Acid Treating Fluid Density, Pounds Per Gallon | Preflush Fluid | |
| | | | | Specific Gravity | Density, Pounds Per Gallon |
| Aqueous Hydrochloric Acid Solution | 15% | 1.075 | 8.95 | 1.10 | 9.16 |
| Aqueous Hydrochloric Acid Solution | 20% | 1.1 | 9.17 | 1.13 | 9.42 |
| Aqueous Hydrochloric Acid Solution | 25% | 1.127 | 9.39 | 1.17 | 9.75 |
| Aqueous Hydrochloric Acid Solution | 28% | 1.14 | 9.5 | 1.19 | 9.92 |
| Methanol-Hydrochloric Acid Solution | 22.4% | 1.04 | 8.67 | 1.06 | 8.84 |

It will be apparent from the foregoing that many widely different embodiments of this invention can be made without departing from the spirit and the scope thereof and the invention should be limited only by the

What is claimed is:

1. A method of acid treating an underground well formation containing one or more fractures comprising:

introducing a preflush fluid into said fractures, and thereafter introducing into said fractures an aqueous acid solution having a specific gravity less than the specific gravity of said preflush fluid;

wherein the specific gravity of said aqueous acid solution, when introduced into said fractures, is adjusted such that when said aqueous acid solution is about one-quarter reacted the specific gravities of said aqueous acid solution and said preflush fluid are substantially equal whereby said acid treating is conducted over the entire faces of said fractures.

2. The method of claim 1 comprising the additional steps of continuously introducing successive quantities of said preflush fluid and said aqueous acid solution into said fractures whereby said aqueous acid solution is maintained in uniform distribution throughout said fractures while flowing therethrough.

3. The method of claim 2 wherein said preflush fluid is an aqueous solution.

4. The method of claim 3 wherein the specific gravity of said preflush fluid at room temperature is in the range of about 1.0 to about 1.4.

5. The method of claim 4 wherein the specific gravity of said aqueous acid solution at room temperature is in the range of about 1.02 to about 1.34.

6. The method of claim 5 wherein said aqueous acid solution is selected from the group consisting of hydrochloric acid, hydrochloric acid-organic acid mixtures and methanol-hydrochloric acid mixtures.

7. The method of claim 6 wherein said preflush fluid is selected from the group consisting of sodium chloride, calcium chloride and potassium chloride solutions.

8. The method of claim 7 wherein the viscosity of said preflush fluid is above about 100 centipoises and the viscosity of said aqueous acid solution is considerably less than about 100 centipoises.

9. A method of fracture acidizing an underground well formation so that high capacity flow channels are formed over the entire fractured interval of the formation which comprises the steps of:

inducing one or more fractures in said formation, introducing a preflush fluid into said fractures while maintaining the fractures in an open position, and thereafter introducing into said fractures an aqueous acid solution having a specific gravity less than the specific gravity of said preflush fluid, maintaining said fractures in an open position so that said aqueous acid solution is distributed throughout said fractures whereby channels are etched in the faces of said fractures, and causing said fractures to close thereby forming high capacity flow channels therein;

wherein the specific gravity of said aqueous acid solution, when introduced into said fractures, is adjusted such that when said aqueous acid solution is about one-quarter reacted the specific gravities of said aqueous acid solution and said preflush fluid are substantially equal whereby said acid treating is conducted over the entire faces of said fractures.

10. The method of claim 9 which is further characterized to include the step of continuously introducing successive quantities of said preflush fluid and said aqueous acid solution into said fractures while holding said fractures open so that said aqueous acid solution is maintained distributed throughout said fractures while flowing through said fractures and said fractures are extended.

11. The method of claim 10 wherein said preflush fluid is an aqueous solution.

12. The method of claim 11 wherein the specific gravity of said preflush fluid at room temperature is in the range of about 1.0 to about 1.4.

13. The method of claim 12 wherein the specific gravity of said aqueous acid solution at room temperature is in the range of about 1.02 to about 1.34.

14. The method of claim 13 wherein said aqueous acid solution is selected from the group consisting of hydrochloric acid, hydrochloric acid-organic acid mixtures and methanol-hydrochloric acid mixtures.

15. The method of claim 14 wherein said preflush fluid is selected from the group consisting of sodium chloride, calcium chloride and potassium chloride solutions.

16. The method of claim 15 wherein the viscosity of said preflush fluid is above about 100 centipoises and the viscosity of said aqueous acid solution is considerably less than about 100 centipoises.

* * * * *